(12) United States Patent
Thomson

(10) Patent No.: US 12,490,730 B1
(45) Date of Patent: Dec. 9, 2025

(54) ADJUSTABLE STRIKE FISHING TIP UP

(71) Applicant: Randall Thomson, Verona, WI (US)

(72) Inventor: Randall Thomson, Verona, WI (US)

( * ) Notice: Subject to any disclaimer, the term of this patent is extended or adjusted under 35 U.S.C. 154(b) by 0 days.

(21) Appl. No.: 19/044,929

(22) Filed: Feb. 4, 2025

(51) Int. Cl.
*A01K 97/01* (2006.01)
*A01K 97/10* (2006.01)
*A01K 97/12* (2006.01)

(52) U.S. Cl.
CPC ............... *A01K 97/01* (2013.01); *A01K 97/10* (2013.01); *A01K 97/12* (2013.01)

(58) Field of Classification Search
CPC ................................ A01K 97/01; A01K 97/12
See application file for complete search history.

(56) References Cited

U.S. PATENT DOCUMENTS

| | | | |
|---|---|---|---|
| 3,147,563 A | 9/1964 | Molter | |
| 3,474,561 A * | 10/1969 | Mcconkey | A01K 97/01 43/16 |
| 4,146,988 A | 4/1979 | Bednarcyk | |
| 4,567,686 A | 2/1986 | Akorn | |
| 4,837,965 A | 6/1989 | True | |
| 7,322,148 B2 | 1/2008 | Coulman | |
| 7,818,913 B1 * | 10/2010 | Hoglund | A01K 97/01 43/16 |
| 7,992,341 B1 * | 8/2011 | Renstrom | A01K 97/01 43/17 |
| 9,974,294 B2 * | 5/2018 | Reiter | A01K 97/12 |
| 10,631,530 B1 * | 4/2020 | Peterman | A01K 97/01 |
| 11,903,374 B1 * | 2/2024 | Groth | A01K 97/10 |
| 2007/0017141 A1 * | 1/2007 | Coulman | A01K 97/01 43/17 |

* cited by examiner

Primary Examiner — Richard G Davis

(57) ABSTRACT

An ice rigger style tip up that can quickly and easily be modified to adjust the amount of force needed by a fish striking the bait to cause activation of a visual indicator. This activation strike force is adjustable by gravitational or magnetic forces. The visual indicator may be a flag released from a horizontal position to a vertical position when the activation force is exceeded.

11 Claims, 8 Drawing Sheets

ADJUSTABLE STRIKE FISHING TIP UP

CROSS-REFERENCE TO RELATED APPLICATION

None.

BACKGROUND OF THE INVENTION

I. Field of the Invention

The present disclosure relates generally to a fishing device, and more particularly to a tip up device having an adjustable force for visual indicator activation.

II. Description of the Prior Art

Historically, ice fishing was limited to the number of poles that had to be held and manipulated, and the space between the holes made in the ice that could be simultaneously reached were minimized due to these limitations. In the more modern era, various devices have been developed that permit a fisherman to place a plurality of hooked baits in different locations about a frozen body of water that did not require the devices to be held or manipulated.

Since fisherman using such modern era devices may be fishing in several locations simultaneously, there has been a need to provide some type of signaling, to notify the fisherman when one or more of these devices is triggered by activity on the line. Such signaling devices are commonly referred to as tip ups, since they lay parallel to the ice when set and waiting for a strike, and then will pop-up or pivot in response to a fish strike. These tip ups commonly utilize colored flags used as the signal, which are typically held parallel to the ice against a spring force.

These ice fishing tip ups have gained widespread acceptance by fisherman as they substantially increase the productivity and enjoyment of a fishing trip while also decreasing the time devoted to the ice hole. These tip ups enable a fisherman to stay within a heated shelter and simply visually monitor the status of a plurality of tip ups active outside of the shelter.

In spite of the utility these devices provide, there are still limitations that remain. For example, trip mechanisms of conventional tip ups can be inconsistent and are difficult for smaller fish to activate the visual indicator. Many times, smaller fish will take the bait and never activate the device. Often, at the conclusion of fishing, the fisherman discovers that either the hook is bare, or a small fish has actually been hooked without ever tripping the device. On the other hand, when fishing for larger game fish, the live bait used by many fishermen is much larger. Consequently, if the tip up flag strike activation sensitivity is too light, the flag indicator of the device can be undesirably activated by the larger bait. Similar problems arise with wind turbulence, nibbles, vibrations, etc. Such false activations of the visual indicator may be referred to as false flags.

There have been a plethora of attempts to remedy this strike sensitivity issue for tip ups. One such attempt is disclosed by Reiter in U.S. Pat. No. 9,974,294, which is incorporated by reference in its entirety herein. Reiter teaches the use of a clip that can be rotated over part of the trigger mechanism to adjust the tip up strike force. However, such an adjustment is either on or off and therefore limited. Another attempt is disclosed by Hoglund in U.S. Pat. No. 7,818,913, which is also incorporated by reference in its entirety herein. Hoglund teaches a design that adjusts the strike force by changing the distance from a lever pivot point to a biased flag and changing the spring constant of the resilient wire. Hoglund further teaches the use of a sliding magnet and its magnetic coupling force. However, the Hoglund design covers the ice hole and requires special constructions and components that are less desirable and not readily adaptable to typical fisherman tackle. Other attempts have resulted in an inability to quickly and properly set the desired sensitivity, the inability to maintain the same strike sensitivity once achieved, etc., and have proven futile.

The present disclosure addresses and fulfills the strike sensitivity needs and complications left by the current state of the art. Accordingly, it is a general object of this disclosure to provide an adjustable strike fishing tip up.

It is another general object of the present disclosure to provide a fishing tip up with a plurality of ranges of strike adjustments.

It is yet another general object of the present disclosure to provide a fishing tip up with a simple and reliable way to provide sensitivity adjustment without sacrificing cost, complexity or convenience.

It is a more specific object of the present disclosure to provide a fishing tip up with a gravitational strike force adjustment.

Yet another more specific object of the present disclosure is to provide a fishing tip up with a magnetic strike force adjustment.

These and other objects, features and advantages of this disclosure will be clearly understood through a consideration of the following detailed description.

SUMMARY OF THE INVENTION

According to an embodiment of the present disclosure, there is provided an adjustable fishing tip up device including a visual indicator biased in an upright position and held in a set position with a holder having a resistive force from the set position to the upright position. A rotatable adjustment member is resistively coupled to the holder as is capable of adjusting the resistive force needed to be exceeded by a strike force of a fish on a line releasably held by the holder.

According to an embodiment of the present disclosure, there is also provided a method of adjusting the activation strike force of a tip up including holding a visual indicator in a set position, baiting a line through a hole in the ice, coupling a section of the line into releasable engagement with a visual indicator holder, adjusting a resistive force with a rotatable adjustment member and releasing the visual indicator into an upright position when a strike force exceeds the resistive force.

BRIEF DESCRIPTION OF THE DRAWINGS

The present disclosure will be more fully understood by reference to the following detailed description of one or more preferred embodiments when read in conjunction with the accompanying drawings, in which like reference characters refer to like parts throughout the views and in which.

DESCRIPTION OF THE PREFERRED EMBODIMENTS

One or more embodiments of the subject disclosure will now be described with the aid of numerous drawings. Unless otherwise indicated, use of specific terms will be understood to include multiple versions and forms thereof.

Figure 1:
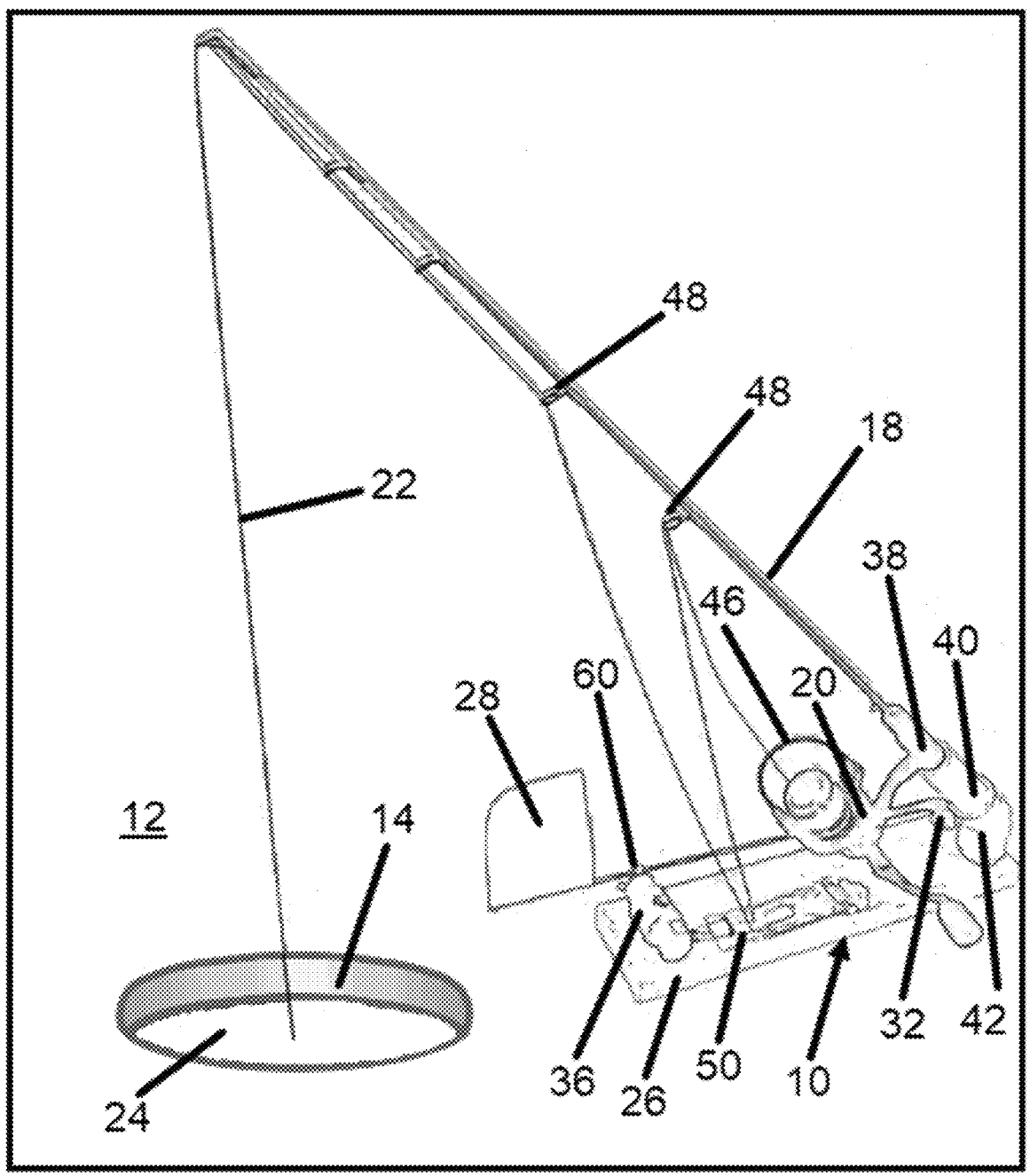
FIG. 1 is a perspective view of the adjustable strike tip up according to the principles of an embodiment of the present disclosure.
Figure 2:
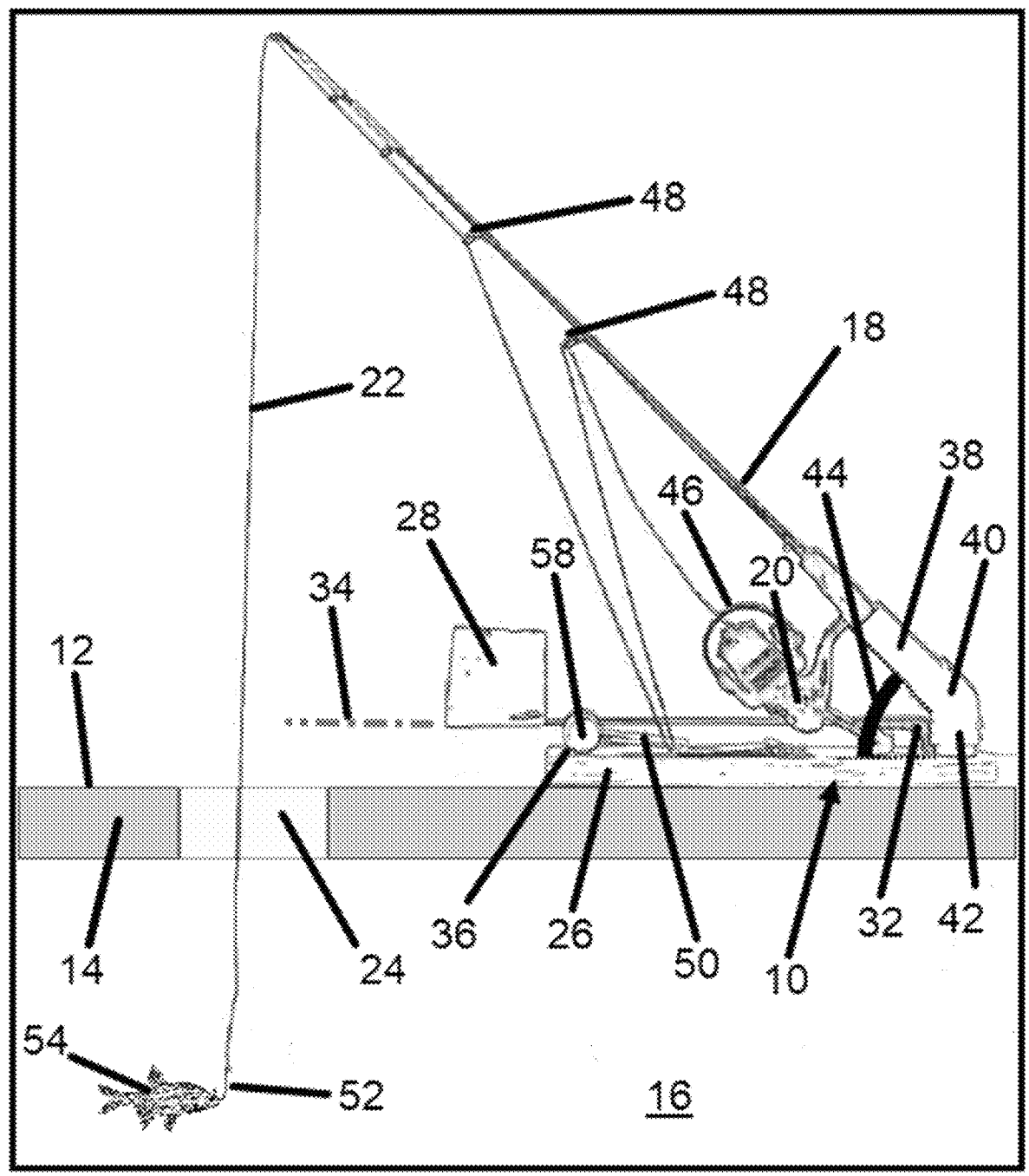
FIG. 2 is a side view of the tip up of FIG. 1 in the baited and set state.
Figure 3:
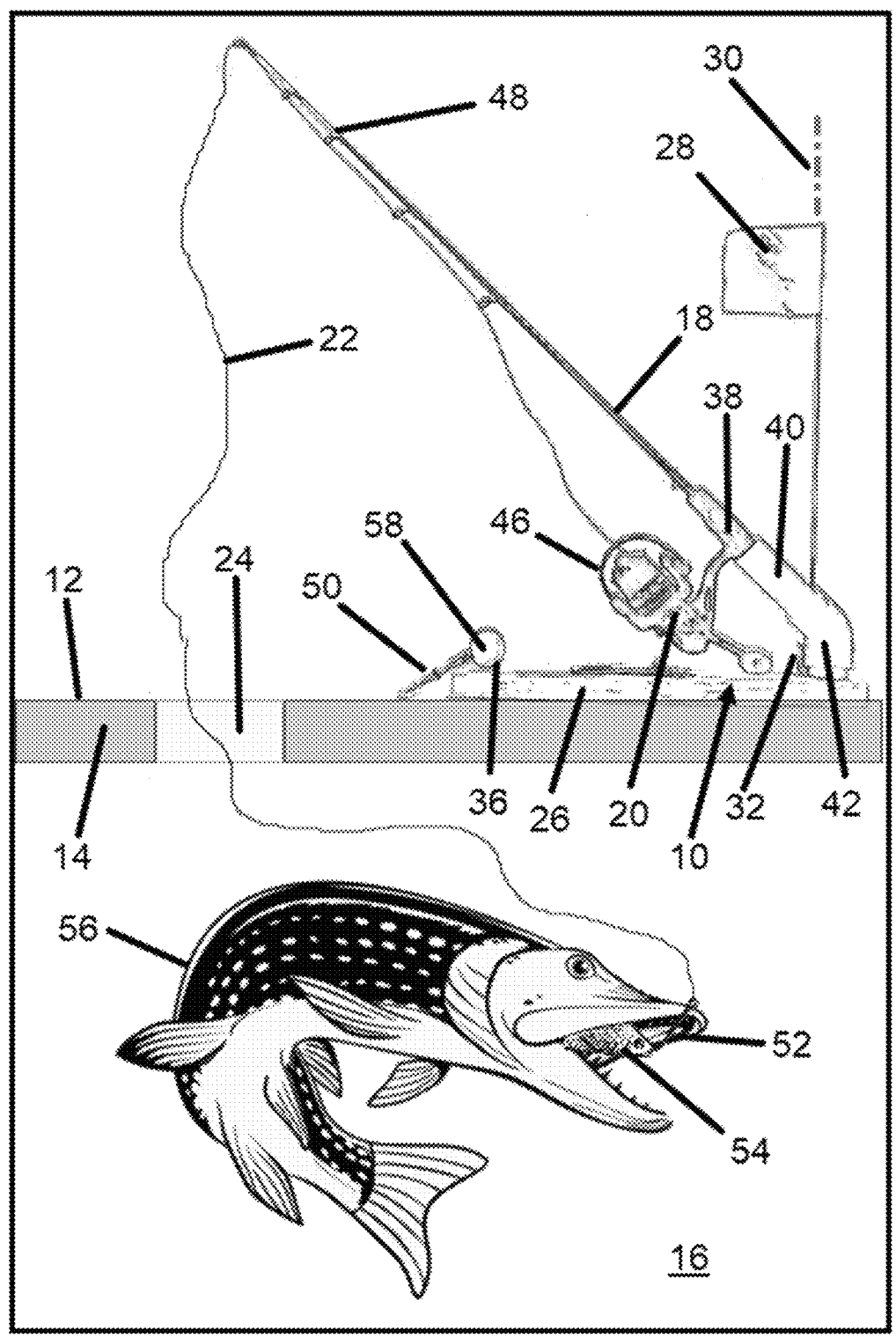
FIG. 3 is a side view of the tip up of FIG. 1 in the activated state.

Referring now to the drawings, and in particular to FIGS. 1-3, the adjustable strike tip up device 10 is shown on the top surface 12 of the frozen ice 14 atop a body of water 16. The device 10 is shown with a rod 18, spinning reel 20 and fishing line 22 wherein the line is passed through a hole 24 in the ice 14. The device 10 may consist of a base 26, a visual indicator or flag 28 biased in an upright position 30 via a spring or the like 32 and held in a generally horizontal position 34 by an indicator holder member 36.

In general, the rod handle 38 is inserted in the rod holder extension tube 40, which may be fixed to the base 26 or pivotable about an axis 42 and lockable at an angle 44. The bail 46 of the reel 20 is opened and a section of fishing line 22 between eyelets 48 is fed down to a line holder 50. The flag 28 is held in the down position 34 by member 36 and the hook 52 is baited 54. The tip up device 10 is now in the set position as shown in FIG. 2. When a game fish 56 takes the bait 54, the fishing line 22 activates the line holder 50 and rotates the indicator holder about its axis of rotation 58 from a first set position with the indicator coupler 60 engaged with the flag 28 to a second actuated position with the coupler 60 disengaged and the flag released to its upright position 30 as shown in FIG. 3.

It is appreciated that in order for the device 10 to be actuated from a set position to an actuated position, the fishing line 22 needs to have a force, referred to herein as a strike force, exceeding the resistance of the rotation indicator holder member from the set position to the actuated position. In other words, this activation force may be defined as the amount of force provided by a fish striking the bait that causes the activation of the visual indicator. It is the ability to adjust the resistive of the set position to the actuated position that translates to the activation strike force that provides the device 10 its utilization and advantage. This adjustment is generally accomplished in one of two ways. First is the gravitational adjustment member which is achieved by utilizing a weighted mass (e.g., one or more magnets) on top of a hinged mass apparatus that is movable towards or away from the hinged mass apparatus axis of rotation. Second is a magnetic adjustment member where a magnet is positioned under the line holder apparatus and is adjustable by the strength and position of the one or more magnets.

Figure 4A:
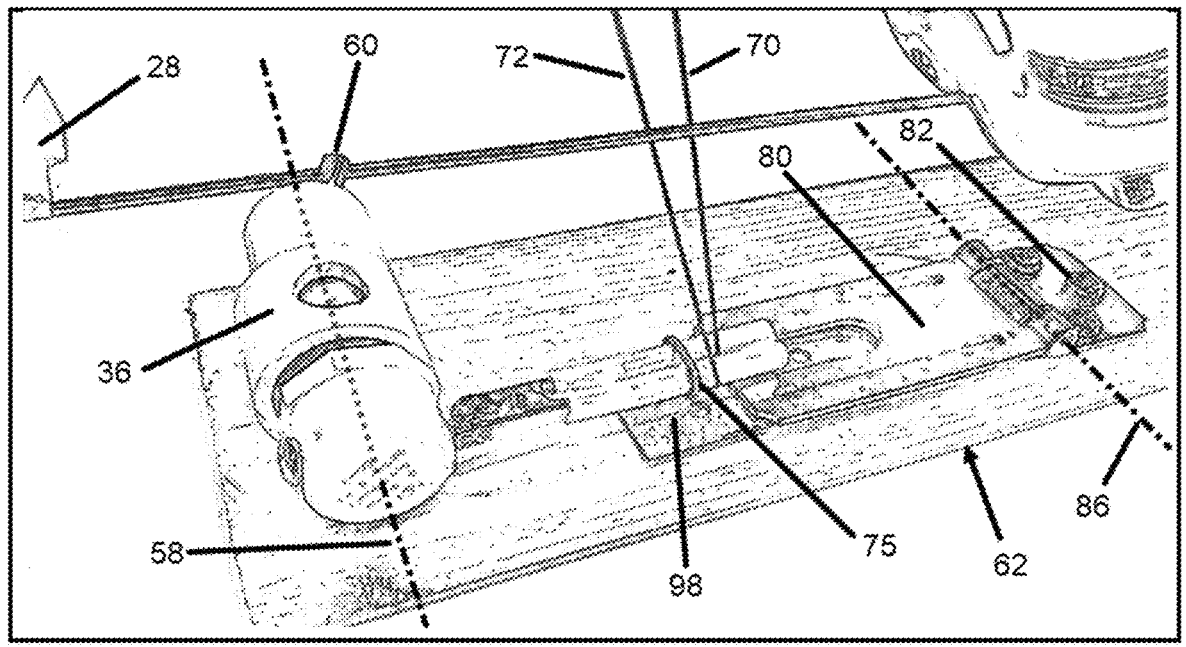
FIG. 4A is an enlarged perspective view of the strike component parts of the tip up of FIG. 1.
Figure 4B:
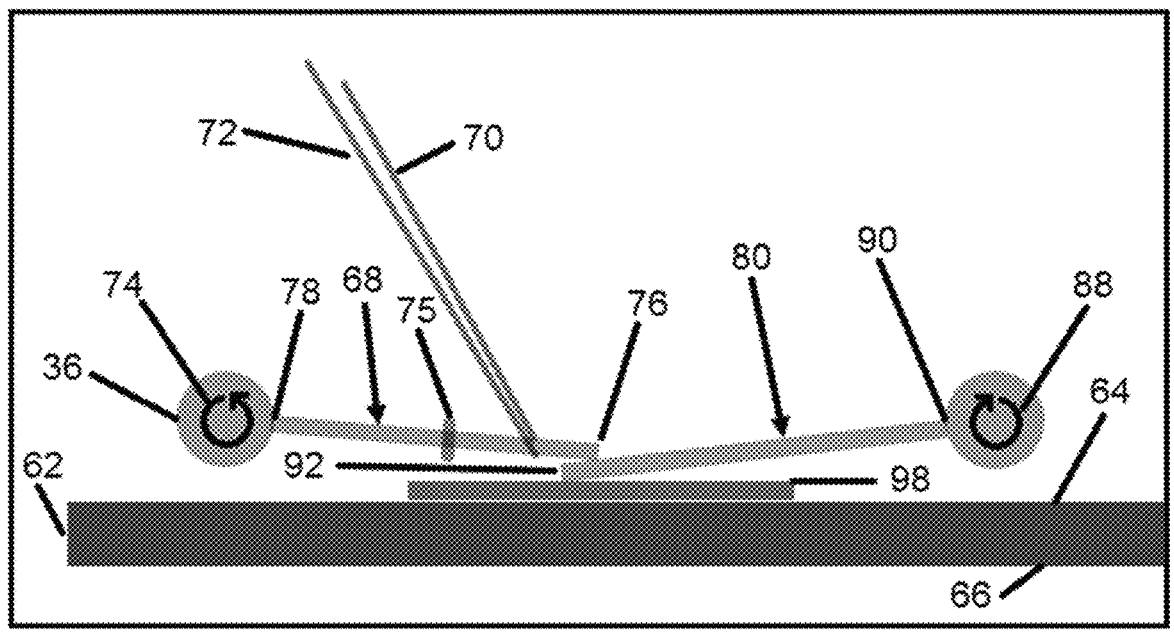
FIG. 4B is a simplified side diagram of FIG. 4A.
Figure 5A:
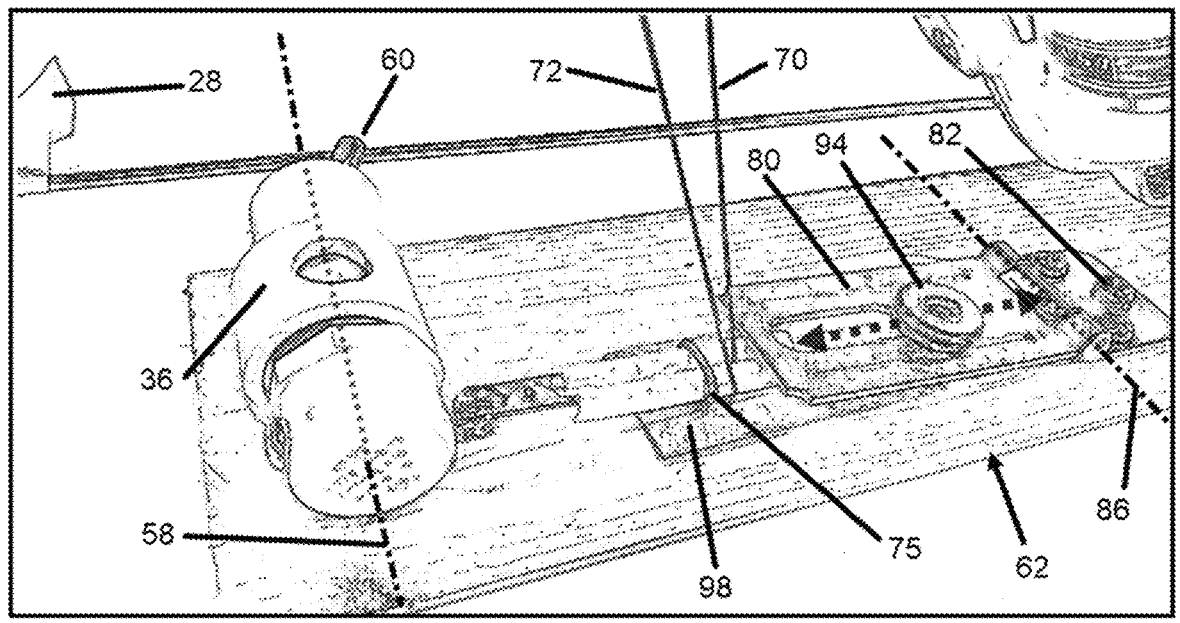
FIG. 5A is an enlarged perspective view of the strike component parts of the tip up of FIG. 1 depicting a gravitational strike adjustment.
Figure 5B:
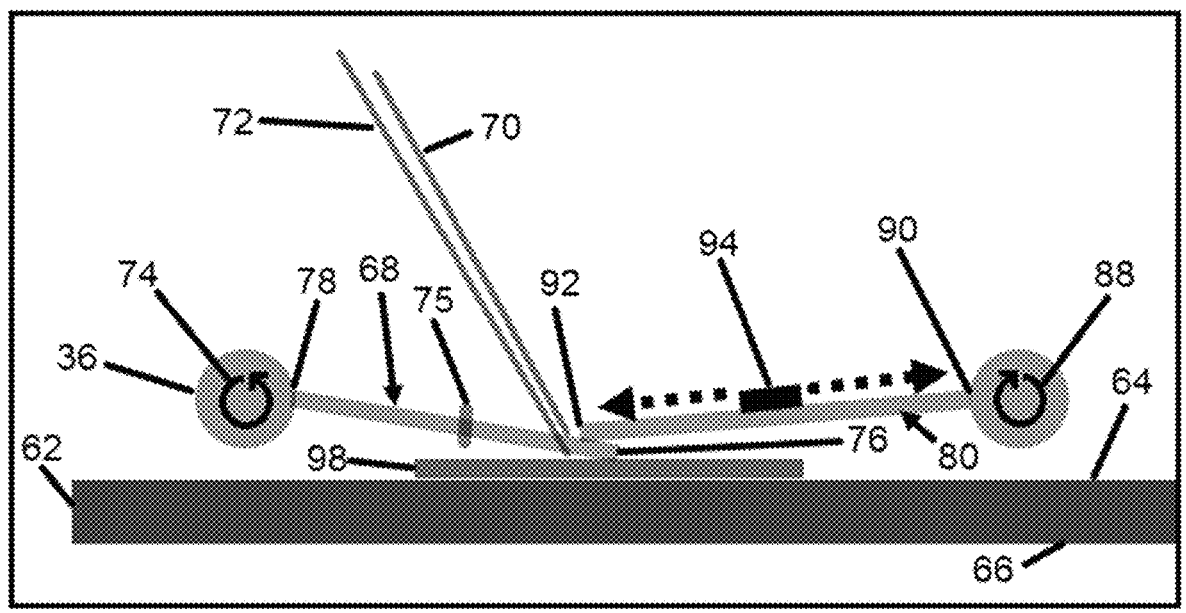
FIG. 5B is a simplified side diagram of FIG. 5A.

The adjustability of the strike force will now be described with reference to FIGS. 4-6. Turning first to FIGS. 4A and 4B, the device 10 has a base 62 with a top surface 64 and a bottom surface 66. The bottom surface 66 supports the device atop the top surface of the ice and the top surface 64 supports the main strike component parts of the tip up. In particular, the indicator holder member or line holder apparatus 36 includes extenders 68 for holding the fishing line. More specifically, the line 22 from the reel spool 70 is positioned under the extender 68 and back to the bait 72. When the activation strike force is reached by exceeding the resistance of the indicator holder, the extender 68 will cause the member 36 to rotate 74, which will have the extender 68 release the line as well as the coupler 60 release the flag 28. This line positioning is set and held within the extender 68 using a line coupler 75 (e.g., rubber band, O-ring, elastic band or the like) to apply proper pinch force to hold the line between the distal 76 and proximal 78 ends of the extender.

The hinged mass member 80 is affixed to the surface 64 of the base 62 via fasteners 82 and includes a mass extender 84 hinged about a mass axis 86. This extender 84 is rotatable 88 about the axis 86 and extends from a proximal end 90 to a distal end 92. The hinged mass member 80 is resistively coupled to the indicator holder 36. In particular, the distal end 92 of the mass extender 80 can rest on top or underneath the distal end 76 of the line extender 68. If on top, then the activation force is increased as the strike will need enough force to exceed the resistance of both the indicator holder 36 and the mass member 80 for both a mass pivot rotation 88 and a line pivot rotation 74 before the indicator coupler 60 is cleared and the flag 28 is free to move into its upright position 30.

More particular strike force adjustability will now be described with the aid of FIGS. 5-6 wherein FIG. 5 will illustrate a gravitational adjustment and FIG. 6 will illustrate a magnetic adjustment. Turning first to FIG. 5, in order to further increase the amount of activation force, a mass is placed on top of the mass member 80. This mass may be slidably coupled, or otherwise, so as to position it closer to the proximal end 92 to increase the necessary strike force or the distal end 90 to decrease the strike force.

Figure 6A:
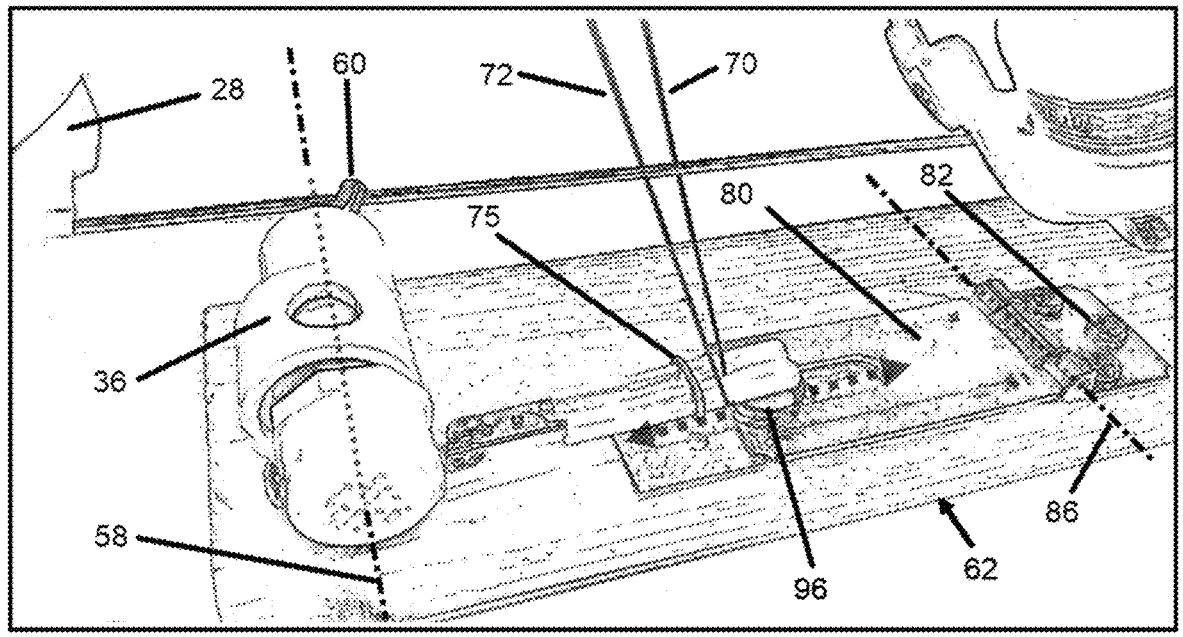
FIG. 6A is an enlarged perspective view of the strike component parts of the tip up of FIG. 1 depicting a magnetic strike adjustment.
Figure 6B:
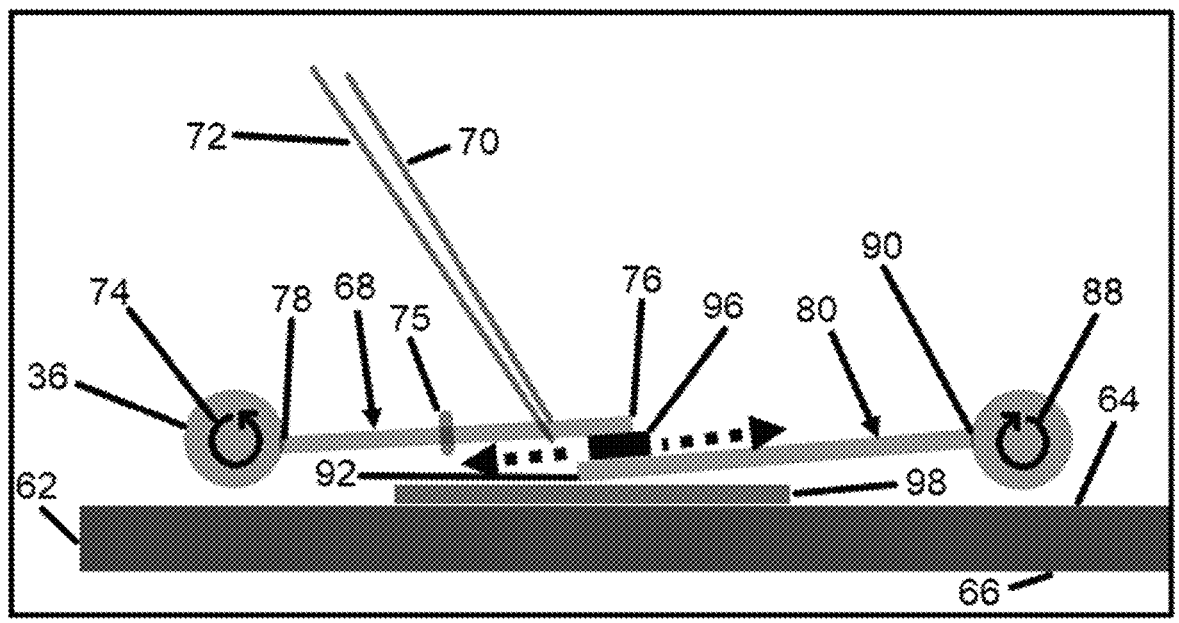
FIG. 6B is a simplified side diagram of FIG. 6A.

Turning now to FIG. 6, the activation strike force can also be adjusted by having a magnet 96 positioned underneath the line extender and on top of the mass extender 80. In this embodiment, the line extender will have metallic properties to give an attractive force to the magnet(s) 96. The position of the magnet, the quantity of the magnet(s) and the strength of the magnet can all be varied to acquire the desired activation strike force.

Figure 7A:
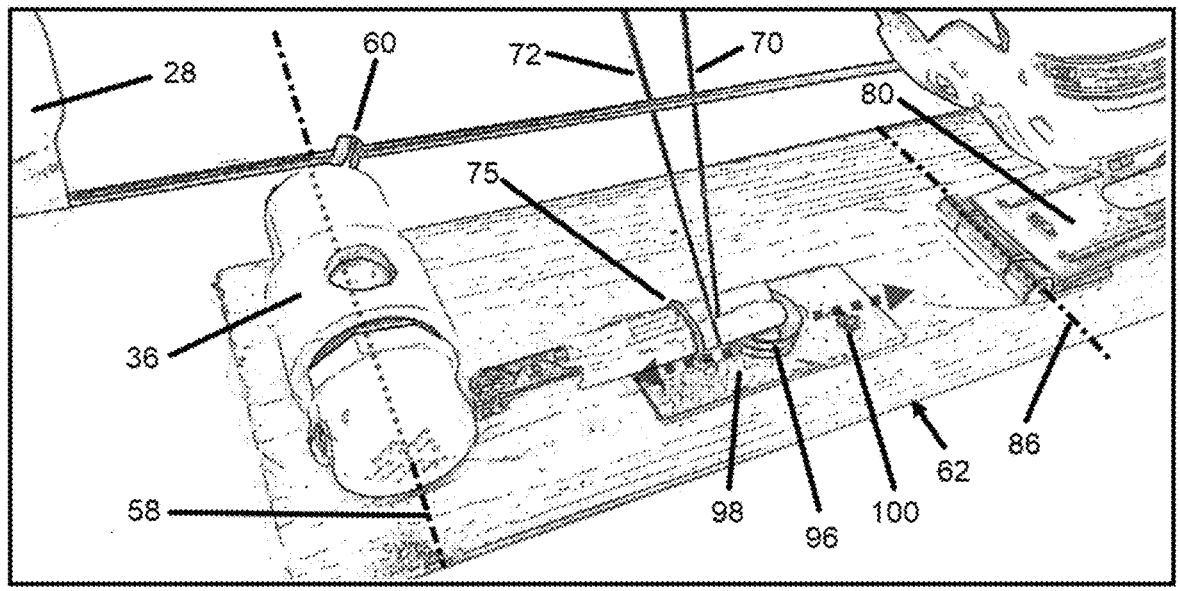
FIG. 7A is an enlarged perspective view of an alternate embodiment of the strike component parts of the tip up of FIG. 1 depicting a magnetic strike adjustment.
Figure 7B:
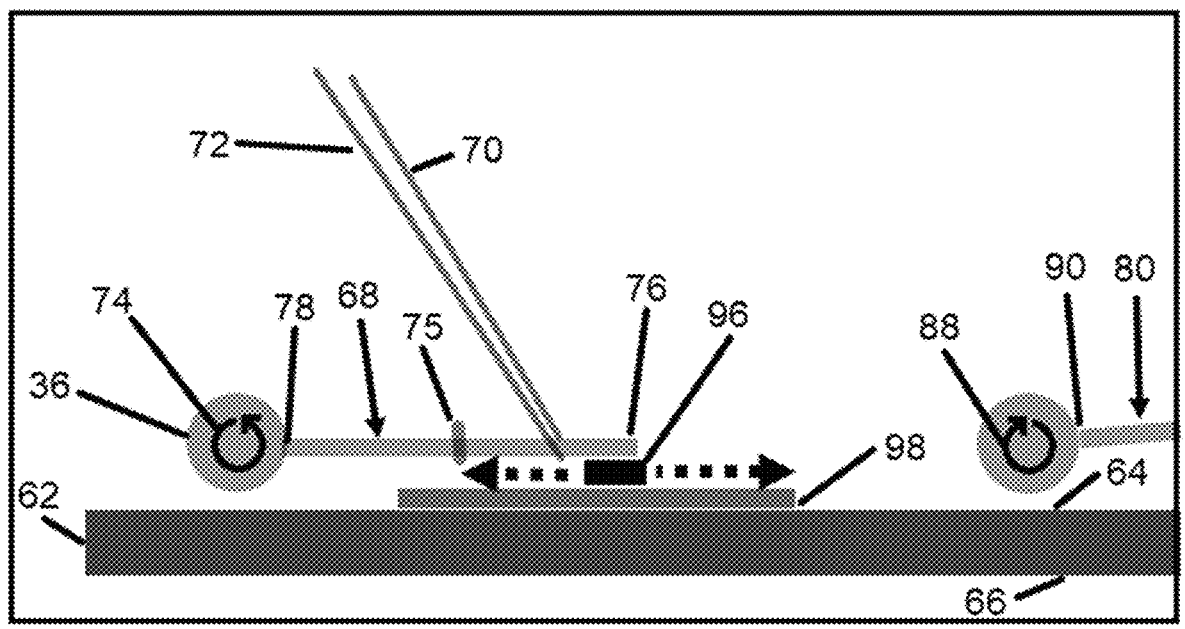
FIG. 7B is a simplified side diagram of FIG. 7A.

FIG. 7 illustrates an alternate embodiment of adjusting the strike force through the use of a magnet. In particular, a base plate 98 is affixed to the top surface 64 of the base 62 of the device 10 via fasteners 100 and includes a magnet 96. The magnet 96 is slidably coupled to the base plate 98 and attracts the metallic properties of the extender 68. The position of the magnet, the quantity of the magnet(s) and the strength of the magnet can all be varied to acquire the desired activation strike force.

Figure 8A:
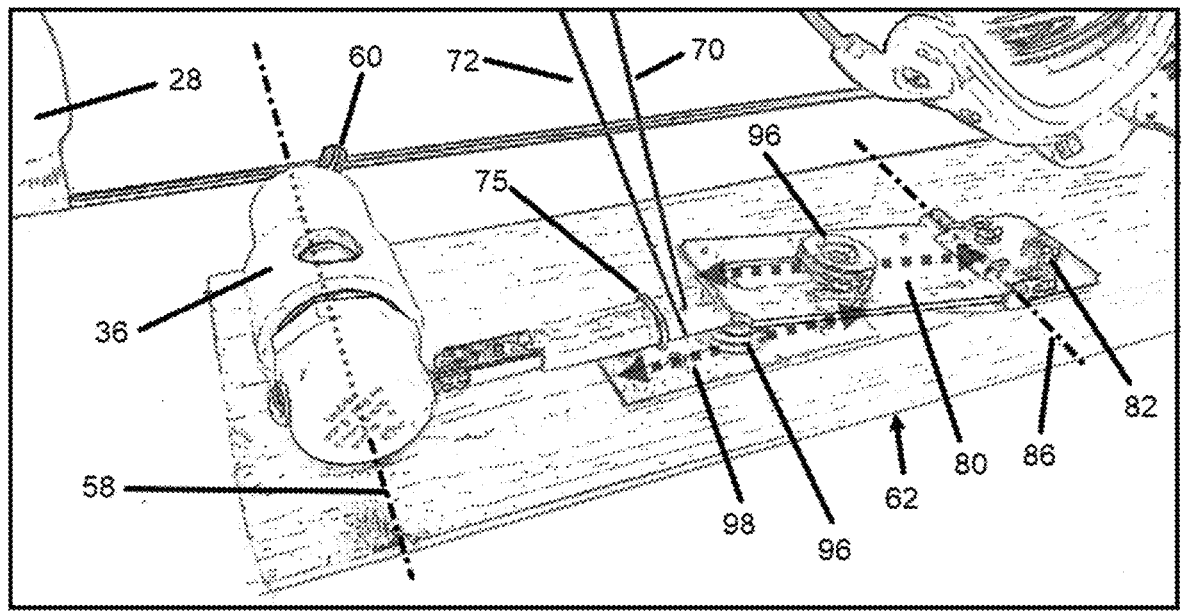
FIG. 8A is an enlarged perspective view of the alternate embodiment of FIG. 7A depicting a gravitational and magnetic strike adjustment.
Figure 8B:
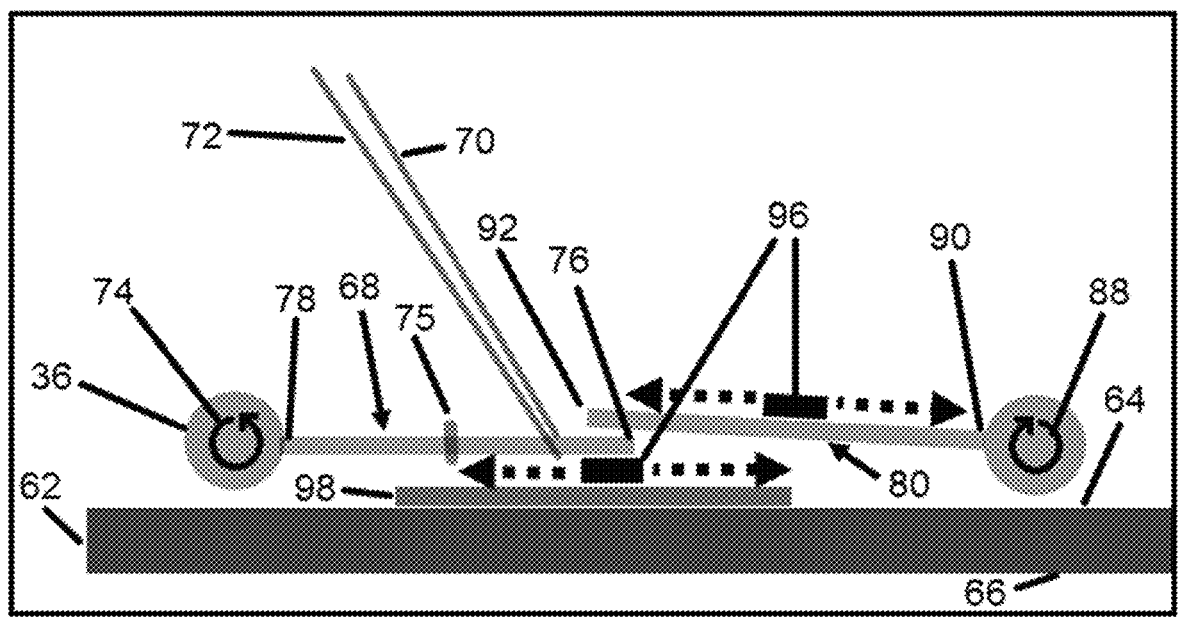
FIG. 8B is a simplified side diagram of FIG. 8A.

FIG. 8 illustrates the adjustment of the strike force through a combination of both the gravitational force and the magnetic force pursuant to the embodiment of FIG. 7. In particular, both the gravitational and magnetic properties can be used simultaneously. Specifically, the magnet 96 of the extender 80 and the magnet 96 upon the base plate 98 can be adjusted to fine tune the strike force needed to actuate the flag 28. The position of the mass/magnet, the quantity of the mass/magnet(s) and the strength of the magnet can all be varied to acquire the desired activation strike force.

The foregoing detailed description has been given for clarity of understanding only and no unnecessary limitations should be understood therefrom. Accordingly, while one or more particular embodiments of the disclosure have been shown and described, it will be apparent to those skilled in the art that changes and modifications may be made therein without departing from the invention in its broader aspects, and, therefore, the aim in the appended claims is to cover all such changes and modifications as fall within the true spirit and scope of the present disclosure.

What is claimed is:

1. An adjustable strike fishing tip up device, said device comprising:
    a visual indicator biased in an upright position;
    an indicator holder for holding said indicator in a set position, said holder having a resistive force from said set position to an upright position;
    said holder releasably coupled to a fishing line;
    a rotatable adjustment member resistively coupled to said holder, said adjustment member capable of adjusting said resistive force; and
    wherein said indicator holder releases said indicator from said set position to said upright position when a strike force on said line exceeds said resistive force.

2. The device as defined in claim 1 further comprising a mass slidably engaged relative an axis of rotation of said member.

3. The device as defined in claim 2 wherein said mass is a magnet.

4. The device as defined in claim 1 further comprising a base plate positioned under said holder and including one or more slidably engaged magnets for adjusting said resistance force of said holder.

5. The device as defined in claim 1 wherein said holder has an axis of rotation whereby said holder is rotated about said axis between said positions.

6. The device as defined in claim 5 wherein said member has an axis of rotation.

7. The device as defined in claim 6 wherein said holder is rotated about said holder axis of rotation and said member rotates about said member axis of rotation when said strike force exceeds said resistance.

8. A method for adjusting the strike force on an ice fishing tip up, the method comprising:
    holding a visual indicator in a set position;
    baiting a line through a hole in a frozen body of water;
    coupling a section of said line into releasable engagement with a visual indicator holder;
    adjusting a resistive force with a rotatable adjustment member; and
    releasing said visual indicator into an upright position when a strike force in said line exceeds said resistive force.

9. The method as defined in claim 8 wherein said adjusting is from a slidable mass.

10. The method as defined in claim 8 wherein said adjusting is from a slidable magnet.

11. The method as defined in claim 8 wherein said adjusting is from a slidable mass and a slidable magnet.

* * * * *